(12) United States Patent
Abel

(10) Patent No.: US 9,321,593 B2
(45) Date of Patent: Apr. 26, 2016

(54) FLEXIBLE PACKAGE TRANSPORT DEVICE FOR PACKAGING MACHINES

(71) Applicant: BOSSAR PACKAGING, S.A., Barbera del Valles (Barcelona) (ES)

(72) Inventor: Sáez López Abel, Barbera del Valles (ES)

(73) Assignee: Bossar Packaging, S.A., Barbera del Valles (Barcelona) (ES)

( * ) Notice: Subject to any disclaimer, the term of this patent is extended or adjusted under 35 U.S.C. 154(b) by 0 days.

(21) Appl. No.: 14/255,348

(22) Filed: Apr. 17, 2014

(65) Prior Publication Data
US 2015/0000438 A1    Jan. 1, 2015

(30) Foreign Application Priority Data

Jun. 26, 2013 (ES) .................................. 201330961

(51) Int. Cl.
| | | |
|---|---|---|
| *B65B 43/46* | (2006.01) | |
| *B65G 17/32* | (2006.01) | |
| *B65B 43/32* | (2006.01) | |
| *B65G 47/86* | (2006.01) | |
| *B65B 43/16* | (2006.01) | |

(52) U.S. Cl.
CPC .............. *B65G 17/323* (2013.01); *B65B 43/16* (2013.01); *B65B 43/32* (2013.01); *B65B 43/465* (2013.01); *B65G 47/842* (2013.01); *B65G 2201/0238* (2013.01); *Y10T 74/18944* (2015.01)

(58) Field of Classification Search
CPC ............... B65G 17/323; B65G 47/842; B65G 2201/0238; Y10T 74/18944; B65B 43/32; B65B 43/46; B65B 43/465
USPC ..................................................... 198/377.03
See application file for complete search history.

(56) References Cited

U.S. PATENT DOCUMENTS

| | | | | |
|---|---|---|---|---|
| 3,985,223 A * | 10/1976 | Forcella | ............... | B65G 47/842 198/377.03 |
| 4,396,109 A * | 8/1983 | Nambu | ................... | A01K 43/00 198/431 |
| 5,141,519 A * | 8/1992 | Smith | .................... | A61B 17/29 30/242 |
| 5,908,283 A * | 6/1999 | Huang | ................... | B65G 47/90 414/21 |
| 6,354,427 B1* | 3/2002 | Pickel | ..................... | A23L 3/001 198/470.1 |
| 2003/0029700 A1* | 2/2003 | Miller | .................... | B65G 17/12 198/803.7 |
| 2007/0018468 A1* | 1/2007 | Behringer | .............. | B65B 43/46 294/87.1 |
| 2011/0186405 A1* | 8/2011 | Blanc | ........................ | B07C 5/36 198/413 |

FOREIGN PATENT DOCUMENTS

ES          2229836 A1   4/2005

* cited by examiner

*Primary Examiner* — Gene Crawford
*Assistant Examiner* — Thomas Randazzo
(74) *Attorney, Agent, or Firm* — Brown & Michaels, PC

(57) ABSTRACT

This device comprises a pair of parallel arms (1, 2) having clamps (11, 21) for clamping the packages (E) to be transported and means for regulating separation which comprise:—a scissor mechanism (4) having two rods (41, 42) articulated to the rear end of the arms (1, 2) and carrying roller means (46, 47);—guide sections (5, 5*a* . . . ) distributed on the packaging machine, provided with a longitudinal track (51) for guiding the roller means (46, 47) of the scissor mechanism (4) and—actuating means (7) suited to moving each guide section (5, 5*a*) and arranging the latter in a position suited to determining the separation of each pair of parallel arms (1, 2) in each area of the route of the transport device by means of a variation in longitude of the scissor mechanism (4).

3 Claims, 5 Drawing Sheets

FLEXIBLE PACKAGE TRANSPORT DEVICE FOR PACKAGING MACHINES

OBJECT OF THE INVENTION

The present invention relates to a flexible package transport device suited to be coupled to an endless conveyor responsible for moving the latter along different stations of a packaging machine, said device comprising at least two parallel arms which have clamps on the opposing laterals for clamping the packages to be transported; said arms being arranged with a separation suited to the width of the packages to be transported and associated with means for the approximation and distancing thereof and carrying out the opening and closing of the mouths of the packages respectively.

FIELD OF APPLICATION OF THE INVENTION

This invention is used in automated packaging machines for flexible packages.

Background of the Invention

At present, different types of packaging machines on the market are widely known, primarily horizontal packaging machines which have a transport device associated with an endless conveyor, said transport device including a pair of parallel arms provided on the opposing laterals of clamps for clamping the packages by the opposing lateral ends and moving the latter between successive work stations.

In these transport devices, each pair of arms must have a nominal separation in accordance with the width of the packages to be transported, said pair of arms also being associated with actuating means capable of carrying out the approximation thereof to the necessary extent for opening the mouth of the package clamped by the same and once the package has been filled with the product to be packaged, triggers the return of said arms to the original position, tightening the mouth of the package and thereby closing the same.

In some of the existing machines on the market, the endless conveyor used to move the transport device through different packaging machine work stations comprises two chains parallel to those which are fixed, the respective arms of each transport device being required to change the phase of each of the chains or mount the arms on the said chains at different positions so that the nominal separation between said arms is suited to the package to be transported.

Obviously this operation is particularly complex from the point of view of mounting when the separation between the arms is modified when the format of the package is changed.

In these machines, in addition to the means necessary for adjusting the nominal separation between each pair of arms on the transport device, it is necessary to provide a second means for triggering the approximation and the distancing of the parallel arms and realizing the opening and closing of the mouth of the transported packages at different areas of the route through the packaging machine.

These second means may have different configurations, generally including actuators generated by means of a set of arms and cams distributed along the route of the transport device through the packaging machine.

This solution is particularly complex owing to the high number of moving elements which intervene in the said machine and owing to the difficulty of synchronizing both the drag chains and the actuators responsible for carrying out the approximation or separation of each pair of parallel arms.

Other flexible package transport devices in packaging machines are of the type described in the patent document, ES 2229836 in which the approaching and separation of the parallel arms carrying the clamps for clamping the packages are formed by primary actuating means which comprise, for each moving arm, one respective worm screw connected to the end of the corresponding arm by a rotating nut and actuated in turn by a motor (10) coupled to the worm screws by means of transmission means which in turn comprise a pinch roller supporting the motor and a lead roller supporting the worm screws.

This construction is also particularly complex and has the disadvantage of requiring, in the case of each pair of parallel arms, the intervention of a motor with the transmission means mentioned above and controlling said motors in a synchronous manner so that they carrying out the approximation and distancing of the arms carrying the clamps at specific areas of the described route by the transport device in the packaging machine.

DESCRIPTION OF THE INVENTION

The flexible package transport device for packaging machines, the object of the present invention, is suited to being coupled to an endless conveyor responsible for moving the latter along different work stations of a packaging machine, and said transport device comprising at least one pair of parallel arms which have, on the opposing laterals, clamps for clamping the packages to be transported and means for regulating the separation between each pair of arms; has a number of constructive distinctive features aimed at simplifying, in a drastic manner, the construction and ease of adjusting the regulating means responsible for separating each pair of arms such that the latter may be adjusted at different points on the circulatory route of the transport device along the packaging machine, solely controlling the movement of guides distributed along the route of said transport device through the packaging machine.

For this purpose and in accordance with the invention, the parallel arms of each pair are mounted with the possibility of being moved longitudinally with respect to a support piece suited to being fixed to an endless conveyor responsible for moving the transport device through different work stations of the packaging machine; the means for regulating the separation between each pair of arms comprising a scissor mechanism arranged on a plane parallel to that defined by the parallel pair of arms, and which comprises two rods associated with each other through an intermediate area by means of a vertical axis of rotation provided with guide means with respect to the support piece in a direction transversal or perpendicular to the direction of longitudinal movement of the parallel arms; said rods each comprising front ends articulated by means of both vertical axes of rotation to the rear end of the parallel arms of one same pair, and both rear ends carrying roller means.

The means for regulating the separation between each pair of arms additionally comprises guide sections distributed in the packaging machine, parallel to the route of the transport device and provided with a longitudinal track for guiding the roller means of the scissor mechanisms associated with each pair of parallel arms; said guide sections being associated with actuating means for moving each guide section in a transversal direction and positioning the latter in a suitable, fairly advanced, position for determining the separation of each pair of parallel arms at each area of the route of the transport device.

With these characteristics, it is sufficient to conveniently position the guide sections along the machine to achieve a variable folding or unfolding of the scissor mechanisms and consequently a simultaneous, longitudinal movement and in opposite directions of the parallel arms with respect to the support piece, with the consequent variation of the separation between said parallel arms.

This transport mechanism allows regulation of both the nominal separation between the parallel arms, for adjusting the latter to the format of the package to be used, and the approximation and separation of the parallel arms of one same pair during the opening and closing of the mouths of the packages to be transported.

DESCRIPTION OF THE FIGURES

In order to complement the description and with the aim of facilitating the understanding of the characteristics of the invention, the present descriptive specification is accompanied by a set of drawings in which, in an illustrative and non-limiting manner, the following is shown.

PREFERRED EMBODIMENT OF THE INVENTION

Figure 1:
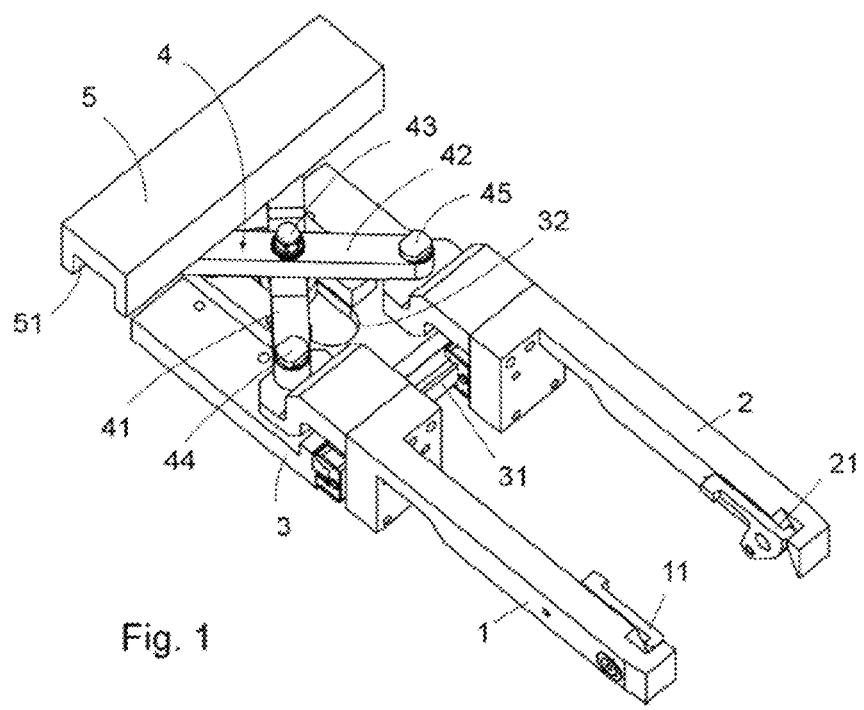
FIGS. 1 and 2 each show perspective views, top and bottom, of an exemplary embodiment of the flexible package transport device for packaging machines according to the invention.
Figure 2:
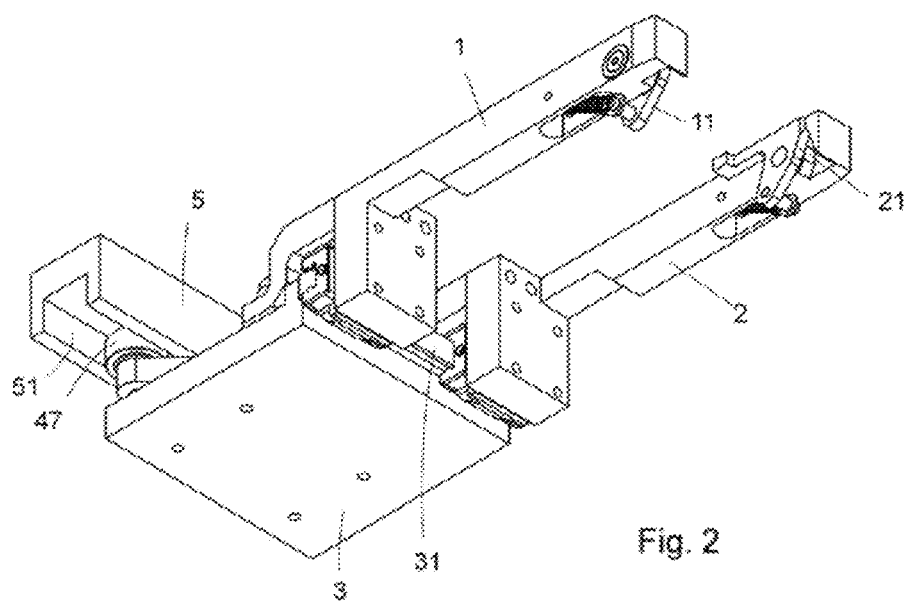
Figure 3:
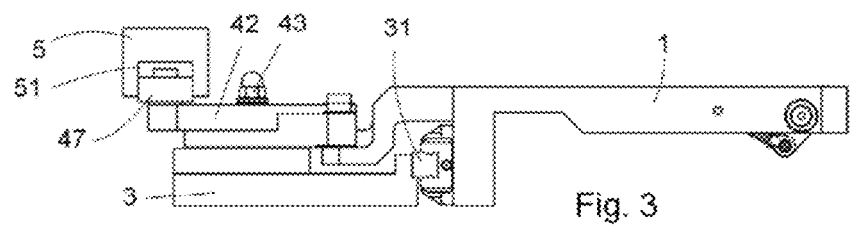
FIGS. 3 and 4 each show side and top plan views of the same transport device of the preceding figures, FIG. 4 being shown partly sectioned.
Figure 4:
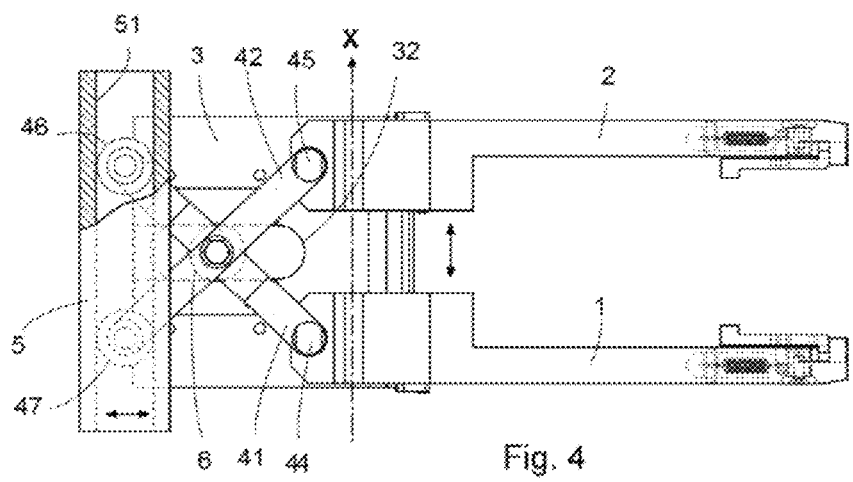

In the example shown, the transport device comprises two parallel arms (1, 2) which, on the opposing laterals, each have clamps (11, 21) for clamping flexible packages to be transported.

Said arms are mounted, by their rear end and with the possibility of moving with respect to a support piece (3) provided with a longitudinal guide (31) for such purpose.

This support piece is suited to being coupled to an endless conveyor (not shown) fitted to the packaging machine responsible for moving the transport device through different workstations of said packaging machine.

In order to regulate the separation between each pair of arms (1, 2), the device comprises a scissor mechanism (4) formed by two rods (41, 42) associated through their intermediate area by means of a vertical axis (43).

The front ends of the rods (41, 42) are articulated on the rear ends of the parallel arms (1, 2) by means of both vertical axes of rotation (44, 45); the rear ends of said rods (41, 42) each being provided with roller means (46, 47) for actuating guide sections (5, 5a, . . . ) distributed on the packaging machine, parallel to the route of the transport device such that, as a function of the fairly advanced position of the guide sections (5, 5a . . . ), this means that the scissor mechanism (4) has a variable longitude and that consequently, the parallel arms (1, 2) approach one another or distance themselves from one another to a greater or lesser extent.

The guide sections (5, 5a . . . ) mentioned are provided with a longitudinal track (51) for guiding the roller means (46, 47) of the transport device of the packages.

The vertical axis (43) which connects the two rods (41, 42) of the scissor mechanism is inferiorly provided with guide means with respect to the support piece; said guide means being shown by a roller element (6) housed in a slotted opening (32) defined on the support plate (3) and orientated in a direction perpendicular to the direction of movement of the arms (1, 2).

Figure 5:
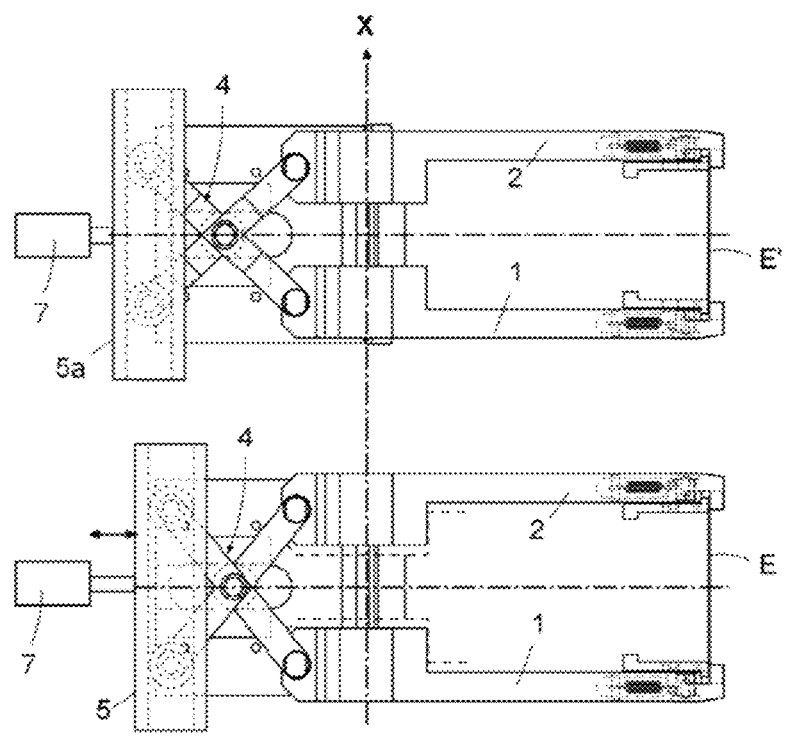
FIG. 5 shows a plan view of the transport device in two operating positions supporting two flexible packages of different formats.

As show in FIG. 5, as a function of the position of the guide sections (5, 5a), the parallel arms (1, 2) are provided with different separation, allowing the packaging machine to work with packages (E, E') of different formats.

Figure 6:
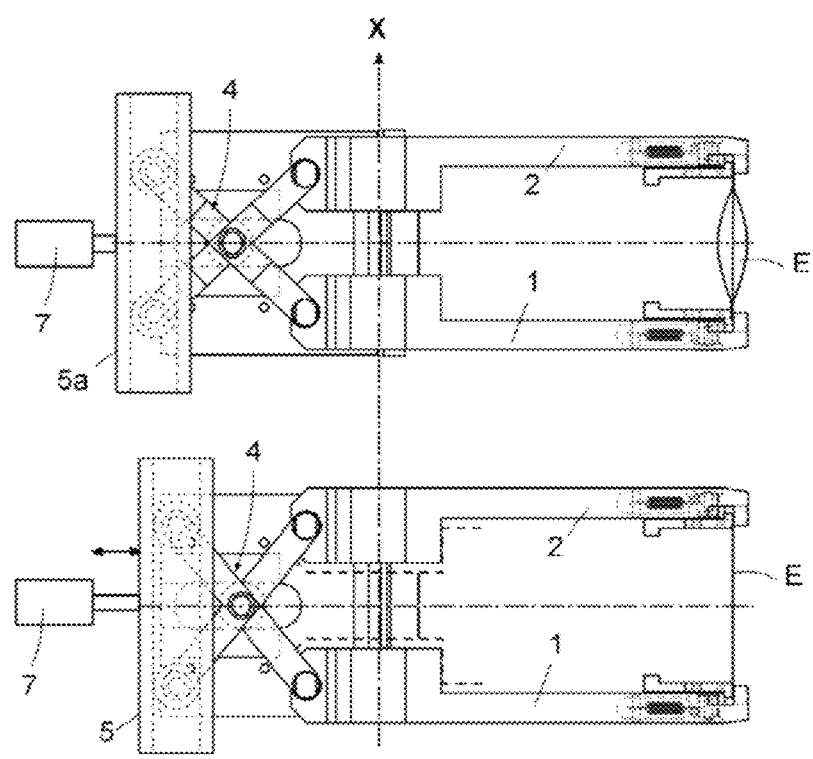
FIG. 6 shows a plan view of the transport device in two operating positions during the transport of the flexible package and with the parallel arms with different separations, carrying out the opening and closing of the mouth of the package.

As may be seen in FIG. 6, once guide sections (5, 5a) have been positioned in a suitable manner to work with a determined package format (E), this transport device is moved longitudinally in the direction of the axis (X), by the action of an endless conveyor (not shown), passing the guide means (46, 47) mounted on the rear ends of the scissor mechanism (4) through successive guide sections (5, 5a) which are arranged in a fairly advanced position by the action of any type of actuating means (7).

As a function of the positions of the guide sections (5, 5a . . . ), the longitude of the scissor mechanism (4) and the separation between the parallel arms (1, 2) can be varied to a suitable extent in order to carry out the opening and closing of the mouth of the package (E) clamped by the clamps (11, 21).

Consequently, as may be deduced from FIGS. 5 and 6, the transport device according to the invention allows the separation between the parallel arms (1, 2) to be varied both for working with different package formats (E, E') and for triggering the opening and closing of the mouth of the package format (E) selected at different work stations of the packaging machine.

Once the nature of the invention as well as an exemplary embodiment have been sufficiently described, it must be stated at the same time that the materials, form, size and arrangement of the elements described may be modified, provided that this does not involved an alteration to the essential characteristics of the invention claimed further on.

The invention claimed is:

1. A flexible package transport device for packaging machines; that includes an endless conveyor that moves to different work stations of the packaging machine, the transport device comprising:
a support piece mounted to the endless conveyor;
at least one pair of parallel arms each having a package connection end and a support piece mounting end, the parallel arms including:
clamps on the opposing package connection ends for clamping a flexible package to be transported, and
a slide mounting connecting the support piece mounting ends to the support piece, wherein longitudinal movement of the parallel arms within the slide mounting regulates the separation between the parallel arms
a scissor mechanism provided on a plane parallel to that defined by the parallel pair of arms including two rods associated with each other through an intermediate area with a vertical axis of rotation wherein each of the rods includes a front end and a rear end, wherein the front end is connected to the parallel arms at the support piece mounting end and the rear end is connected to a roller element, wherein the scissor mechanism is articulated by movement of the rear ends closer or further away from the vertical axis of rotation and which in turn causes the front ends to move and causes the pair of arms to move within the slide mounting further apart as the rear ends move closer to the vertical axis of rotation and closer together as the rear ends move further away from the vertical axis of rotation;

at least one guide section on the packaging machine, parallel to the route of the endless conveyor that guides the roller elements of the scissor mechanism; and an actuator that can move the at least one guide section in a transversal direction and engaging the rollers such that the rear arms move to a selected position and thereby determine the separation of each pair of the parallel arms at each area of the route of the transport device by variation in the longitude of the scissor mechanism.

2. The transport device according to claim 1, wherein the support piece includes a guide for a connector of the rods of the scissor mechanism such that the vertical axis of rotation associating the rods of the scissor mechanism moves with respect to the support piece in a direction perpendicular to the direction of longitudinal movement of the parallel arms.

3. The transport device according to claim 2, wherein the scissor mechanism includes a rolling element at the vertical axis of rotation of the rods that engages the guide on the support plate.

* * * * *